UNITED STATES PATENT OFFICE.

DAVID BATES, OF BONHAM, TEXAS.

LINIMENT.

SPECIFICATION forming part of Letters Patent No. 398,024, dated February 19, 1889.

Application filed December 19, 1888. Serial No. 294,092. (No specimens.)

*To all whom it may concern:*

Be it known that I, DAVID BATES, of Bonham, in the county of Fannin and State of Texas, have invented a new and useful Improvement in Liniments, of which the following is a specification.

My invention is in the nature of an improved antiseptic liniment for the treatment of all kinds of wounds, such as cuts, bruises, burns, poisonous stings or bites, old sores, sprains, and also for lame back, erysipelas, and painful joints, as well as certain complaints of the stomach and bowels. It is also useful for removing and keeping out the "screw-worm" in cattle and other stock.

In compounding the liniment I take one gallon of raw flaxseed-oil (linseed-oil) and one gallon of spirits of turpentine and mix them in a three-gallon stone jar and make the mixture lukewarm by putting it in the sun for three or four hours. I then add to the two gallons of the mixture four ounces of commercial sulphuric acid or oil of vitriol. I pour in the sulphuric acid slowly in a small stream of the size of a broom-straw and move the bottle containing the acid about over the top of the jar when pouring, so as to distribute the acid in different places, the jar being still kept in the sun or kept lukewarm. The addition of the acid causes the contents of the jar to become boiling hot. After the acid has been added the mixture is moved to a cool place, covered up, and allowed to stand perfectly still for twelve hours. After standing this length of time the mixture will be found to have separated into two parts. The clear red-looking fluid is then poured or decanted off, and the tarry-looking dregs, of which there will be about a pint, are removed. The jar is then cleaned by being wiped with a cotton cloth without using any water, and the clear red fluid is poured back into the same, and to each gallon of this fluid is now added one ounce of pure oil of winter-green, which is well stirred into it, and then I add one ounce of oil made from seasoned bois d'arc wood or osage-orange, the oil being obtained from this wood by the usual process of distillation of tar. This is then stirred into the mixture, and then I add to each gallon of the mixture four ounces of strong tincture of button-snake root (*Eryngium aquaticum*) and four ounces of strong tincture of wild indigo, (*Baptisia tinctoria.*) The compound is then ready for use.

For external applications the compound is applied to or rubbed upon the parts. In some cases it is desirable to administer it also internally, as in cases of hydrophobia or poisoning from animals, in which case it is administered in doses of from twenty to forty drops in linseed-oil every two or three hours. I also find such internal applications useful in cases of dysentery and colic.

The compound acts also as an insecticide, as well as an antiseptic, and destroys such germs and insects as are productive of disease, and keeps away bugs, mosquitoes, and other insects.

Having thus described my invention, what I claim as new is—

The liniment herein described, consisting of linseed-oil, turpentine, sulphuric acid, oil of winter-green, oil of osage-orange, tincture of button-snake root, and tincture of wild indigo, in about the proportions described.

DAVID BATES.

Witnesses:
L. N. EDWARDS,
E. D. HODGES.